United States Patent [19]

Beckon

[11] Patent Number: 4,818,261

[45] Date of Patent: Apr. 4, 1989

[54] REVERSED PULSE CLEANING FILTER

[76] Inventor: Weir E. Beckon, 10166 Boone Circle, Bloomington, Minn. 55438

[21] Appl. No.: 108,450

[22] Filed: Oct. 15, 1987

[51] Int. Cl.$^4$ .............................................. B01D 46/10
[52] U.S. Cl. ....................................... 55/498; 55/302; 55/502
[58] Field of Search ........................... 55/498, 302, 502

[56] References Cited

U.S. PATENT DOCUMENTS

| | | |
|---|---|---|
| 3,608,282 | 9/1971 | Ririe ........................................ 55/302 |
| 4,209,310 | 5/1980 | Berkhoel ................................ 55/273 |
| 4,218,227 | 8/1980 | Frey ......................................... 55/302 |
| 4,278,454 | 7/1981 | Nemesi ................................... 55/302 |
| 4,345,922 | 8/1982 | Grassel ................................... 55/302 |
| 4,539,025 | 9/1985 | Ciliberti et al. ....................... 55/302 |
| 4,578,092 | 3/1986 | Klimczak ............................... 55/302 |
| 4,666,472 | 5/1987 | Klimczak et al. ..................... 55/302 |

FOREIGN PATENT DOCUMENTS 2842455 4/1979 Fed. Rep. of Germany ........ 55/302

*Primary Examiner*—Bernard Nozick
*Attorney, Agent, or Firm*—Schroeder & Siegfried

[57] ABSTRACT

An improved air filter for use in a filtering system which uses reverse air pulse cleaning of a filter medium which is surrounded by and connected in sealed relation to an exterior housing. An energy absorption means is incorporated within the housing in such a manner as to prevent the direct flow of the reverse air pulses during cleaning from directly contacting the seal between the filter medium and the housing, whereby, the air flow is redirected through the filter medium before reaching the seal, thereby lessening the force upon the seal and preventing rupture thereof.

15 Claims, 2 Drawing Sheets

REVERSED PULSE CLEANING FILTER

BACKGROUND OF THE INVENTION

A conventional filter for use in a reverse air pulse cleaning filter system is generally comprised of a conventional filtering medium having a housing therearound to support the filter medium, and is constructed and arranged to allow air to freely flow through the filter medium. The housing generally has a inner perforated core with an outer surrounding perforated exterior which are connected together at its base and top end by a base plate and top plate, respectively. The filter medium is disposed between the inner core and the exterior of the housing and is supported thereby. Generally, the filter medium is also connected to the base and top plates thereby creating a seal between such plates and the filter medium.

Generally, the air flow in a conventional filter flows from the exterior of the filter through the outer body of the housing, into the filter medium where the purifying of the air takes place, and then out through the perforated core of the filter housing. When cleaning of the system is desired, the direction of the air-flow is reversed and highly pressurized pulses of air are introduced into the core of the filter and are forced outwardly through the filter medium when the reverse jet air pulses come in contact with the base plate of the filter.

Generally, the reverse air pulses which are introduced into the filtering system are quite strong and can damage the internal structure of the filter. Conventional filters which are reverse air pulse cleaned often contain baffles or sleeves in the outputs of the filters where the reverse pulse is introduced to redirect the natural flow and force of the air pulse so that the filter medium will not be damaged thereby. Quite often the air flow is redirected away from the filter medium to an end plate at the end of the filter to avoid the direct contact of the filter medium.

However, portions of the filter structure other than the filter medium may also be damaged by the high pressure of the reverse pulse air cleaning. For example, the seal between the filter medium and the housing around the filter medium may be ruptured by the high force of the pressurized reverse air flow. This is particularly true when such filter systems direct the reverse air pulses towards the end plates of the filters where the filter medium is commonly connected to the housing.

Thus, there has been a long-felt need for a filter which will be constructed so as to prevent the impact of the pressurized reverse pulses of air which are introduced to clean the filter from damaging the filter medium or the seal between the filter medium and housing. The present invention offers a solution to this problem.

BRIEF SUMMARY OF THE INVENTION

The new improved invention introduces an energy absorption means in the form of a plate or disk which is inserted into the core of the filter and is positioned adjacent to but spaced from the base plate of the filter and generally transverse to the direction of the reversed air flow which is introduced for cleaning purposes. The energy absorption plate is secured to the inner walls of the perforated core and is constructed and arranged to absorb the direct force of the reverse pulses of air, thereby insulating the seam between the filter medium and the base plate from any direct air pressure introduced during cleaning.

Instead of the reverse air flow striking the seam directly, the air pressure strikes the energy absorption plate which, in turn, forces the air out through the perforated core into the filter medium before reaching the seam. As a consequence, the force exerted on the base plate is substantially reduced as is the likelihood of rupturing the seal between the filter medium and the base plate.

Because the energy absorption plate is connected to the inner core of the filter, the force of the reverse jet air pulses used for cleaning the filter are substantially dissipated through the walls of the inner core and the top plate which secures the inner core to the outer body of the filter. Thus, by dissipating the force through the inner core and the top plate of the filter housing the direct force of the reverse air pulse is neither directed at the filter medium nor at the seam between the filter medium and the base plate. Consequently, less strain is put on the weaker portion of the air filter and the life of the filter is extended.

BRIEF DESCRIPTION OF THE DRAWINGS

A detailed description of one preferred embodiment of the IMPROVED REVERSED PULSE CLEANING FILTER is hereafter described with specific reference being made to the drawings in which.

DETAILED DESCRIPTION OF THE PREFERRED EMBODIMENT

Figure 1:
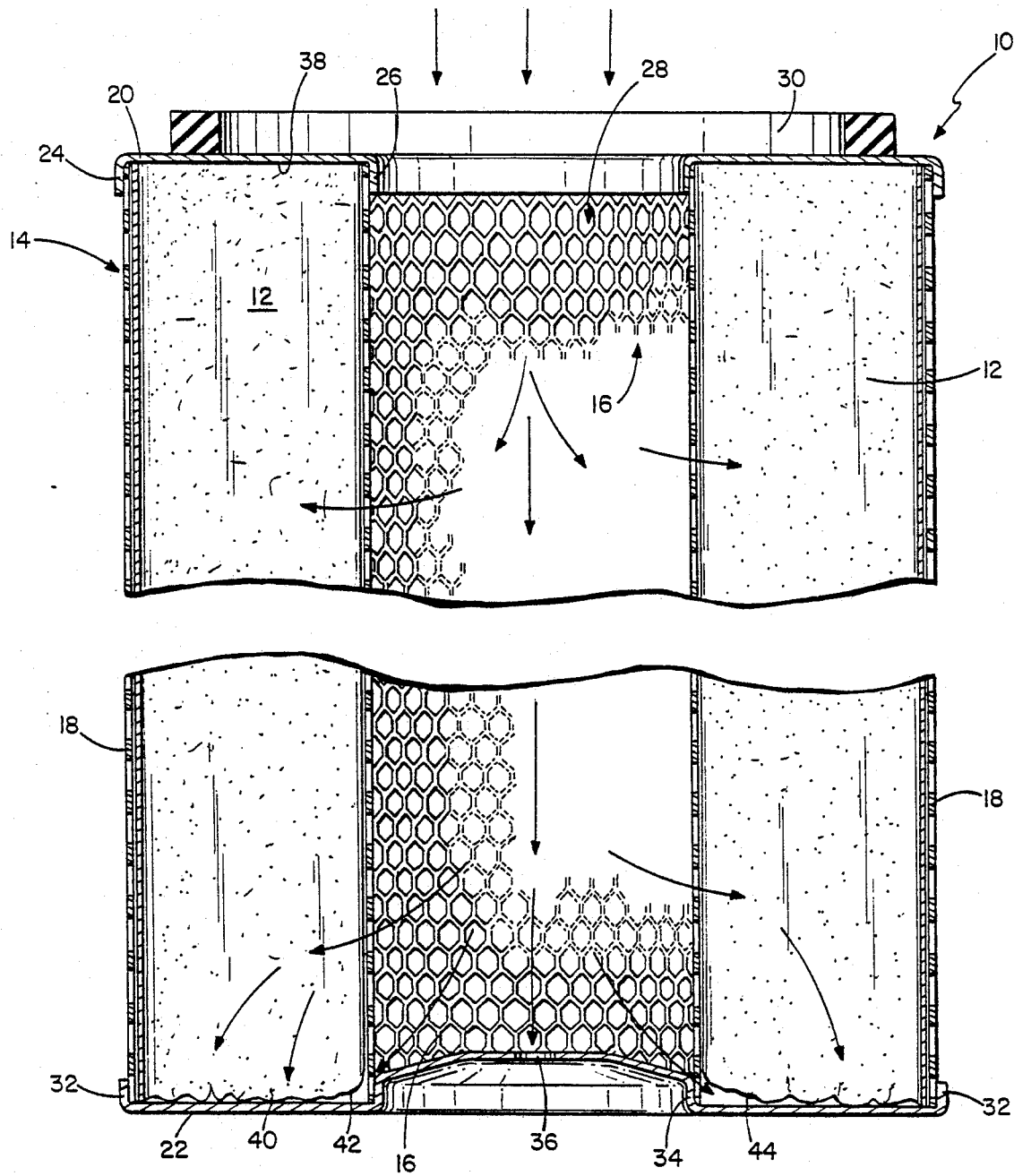
FIG. 1 is a sectional view of a conventional type air filter showing the direction of the reverse air pulses which are introduced into the filter for cleaning the same, and also showing the damage that may be caused to the seal between the filter medium and the base plate from reverse air pulse cleaning.

Shown in FIG. 1 of the drawings is a conventional filter 10 for use in a reversed air pulse cleaning filter system. Filter 10 is generally comprised of a filter medium 12 having a metal housing 14 therearound and containing the filter medium 12 so as to allow the free flow of air therethrough. Housing 14 has a perforated metal inner core cylinder 16 and a perforated outer body cylinder 18 which is coaxially oriented with respect to the inner core cylinder 16 and surrounds the same. The filter medium 12 is disposed between the inner core cylinder 16 and the outer surrounding body cylinder 18.

The filter medium 12 is held in place between the inner core cylinder 16 and outer body cylinder 18 and is enclosed therebetween by a pair of end plates constituting a top end plate 20 and a base plate 22. Each end plate, 20 and 22, are generally ring-shaped and have a central bore therethrough and constitute a portion of the housing.

The top plate 20 has an outer flanged portion 24 and an inner flanged portion 26 which are bent downwardly as shown in FIG. 1 and function to overlap and connect to the outer body cylinder 18 and the inner core cylinder 16, respectively. Top plate 20 acts essentially as a top cover for the area enclosed between the outer body cylinder 18 and the inner core cylinder 16, with the central bore in the top plate 20 creating a channel or air inlet passage way 28 into the center of the filter 10 where air may enter and escape. Top plate 20 also carries a resilient sealing ring 30 on its top surface.

The lower base plate 22 also has an outer flanged portion 32 and an inner flanged portion 34 which, similar to such portions of the top plate 20 overlap and connect to the outer body cylinder 18 and the inner core cylinder 16, respectively. The formation of the base plate 22 functions essentially as a bottom cover for the area between the outer body cylinder 18 and the inner core cylinder 16, thereby completing the enclosure of the area therebetween and containing the filter medium 12 therein.

The inner flanged portion 34 is bevelled radially inward and toward top plate 20 and terminates at the central bore 36 of base plate 22. The central bore 36 has a considerably smaller diameter than the diameter of channel 28 and is constructed and arranged to facilitate mounting of filter 10. It should be noted that the configuration of filter 10 shown in the drawings is used only for ease in discussion and does not limit the scope of this invention only to filters of such configuration. The invention described herein is applicable to other configurations of filters as well.

Although other housing configurations are possible for enclosing a filter medium, the filter medium contained within housing 14 of the filter 10 shown in fig. 1 is necessarily of a cylindrical shape. The filter medium 12 is sealably connected to the end plates 20 and 22 by means of a glue such as an epoxy or plastisol. Seams or seals 38 and 40 are formed by the connection of the filter medium 12 to the top end plate 20 and base plate 22, respectively.

The normal flow of air through the conventional filter 10 is from the outer confines of the filter through the perforations in the outer body cylinder 18 into the filter medium 12 where the impurities in the air are thereby removed. The clean air then escapes through the perforations of the inner core cylinder into channel 28 or air inlet passage way 28 and exits through the central bore of top plate 20.

When the filter is periodically cleaned by the injection of pressurized reversed air pulses, the direction of air flow is reversed as shown by the arrows in FIG. 1. The reversed air pulses are injected into filter 10 from a reverse air pulse source through the central bore of the top plate 20 and into channel 28 of the filter. When the reversed air pulses are introduced into the filter 10 they are directed towards the base plate 22. These reversed air pulses for cleaning generally range from a force of 30 to 120 pounds lbs/in$^2$, and the base plate 22 in a conventional type filter as shown in FIG. 1 will generally feel the full force of the these reversed air pulses. As a consequence, quite often the seal 40 between the filter medium 12 and the base plate 22 is ruptured by these high forces (shown in FIG. 1 at points 42 and 44) thereby damaging the filter construction.

Figure 2:
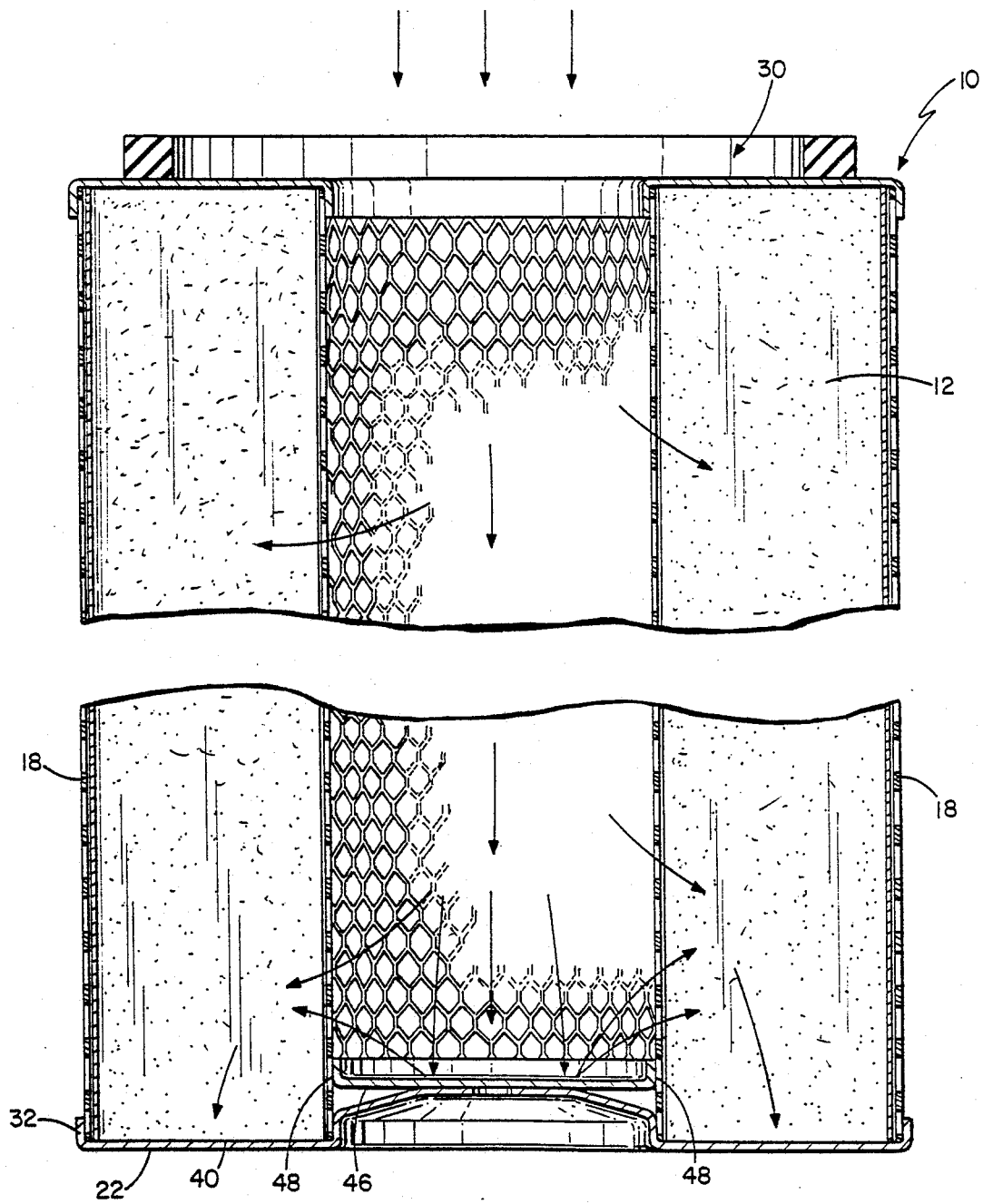
FIG. 2 shows the new improved air filter for use in a reverse air pulse cleaning filtering system which introduces the use of an energy absorption plate in the core of the filter near the base plate.

The invention of the present application, as shown in FIG. 2, is comprised of an energy absorption plate or protector plate 46 which is introduced into channel 28 and is disposed at a point closely adjacent to the base plate 22 and transverse to the direction of reversed air pulses introduced for cleaning. The energy absorption plate 46 corresponding to such a filter 10 as shown in FIG. 1 and FIG. 2 is disc-shaped and has a cross-sectional area which is substantially the same as that of channel 28. It will be noted, however, that the energy absorption plate may be of different configurations when filters of different configurations are used, and is not limited in any respect to the configuration shown in FIG. 2.

The energy absorption plate 46 is connected about its perimeter to the walls of the inner core cylinder 16 (examples designated by points 48 in FIG. 2). Because the energy absorption plate 46 is disposed generally transverse to the direction of reversed air pulses introduced for cleaning the filter 10, the force of such air pulses which are directed towards the base plate 22 contact the energy absorption plate 46, as shown in FIG. 2, rather than directly impinging upon base plate 22. By so doing, the force of the air pulses is absorbed and dissipated by the energy absorption plate 46 through the walls of the inner core cylinder 16 and the top plate 20, as each of these parts of the filter 10 are connected together. Thus, the direct forces of the reversed air pulses introduced for cleaning do not directly impinge upon the base plate 22 and consequently the seam 40 between the filter medium 12 and the base plate 22 is not stressed, nor likely to rupture. Instead, the reversed air flow is deflected off the energy absorption plate 46 as shown by the arrows in FIG. 2, and with much less direct force, enters the filter medium 12 before ever reaching seam 40.

Therefore, by introducing the plate member 46 into a filter system 10 in such a position that the direct force of reversed air pulses which are introduced for cleaning initially contact the transverse plate member 46 rather than directly upon the filter medium 12 or base plate 20 effectively reduces the stress upon seam 40 between the filter medium 12 and the base plate 22.

It is reiterated that by having the plate 46 being disposed transversly to the reversed air pulses and having plate 46 connected to the inner walls of the core cylinder 16 of the housing 14, which in turn is connected to the top plate 20, the direct force of the reversed air pulses can be effectively absorbed and dissipated through the inner core cylinder 16 and top plate 20. Thus, damage to the more fragile portions of the filter 10, such as the filter medium 12 and seam 40 can be prevented.

In considering the invention, it should be remembered that the present disclosure is illustrative only and the scope of the invention should be determined by the appended claims.

What is claimed is:

1. A reverse air pulse cleaned filter for use in a filtering system where cleaning of the filter is done by injecting a reverse air pulse therein from a reverse air pulse source, said filter comprising:

(a) a filter medium for filtering foreign particles from a gaseous medium;

(b) a perforated housing connected to and enclosing said filtering medium, said housing having end plates which are sealably connected to said filtering medium, wherein one of said end plates has an inlet for the reverse air pulses and said other end plate forms an opposed seal relative to said inlet, said housing being constructed and arranged to support said filtering medium;

(c) said housing defining an air inlet passageway having an axis of air travel therethrough for receiving the reverse air pulses to clean accumulated dirt particles off said filter medium, and for allowing the filtered gaseous medium to escape therefrom; and (d) a rigid imperforate seal protector means transversely disposed within said air inlet passageway and devoid of substantial axially extending flow directing structure, said seal protector means being separate from said housing and supported thereby for absorbing the reversed air pulses during cleaning and for protecting said opposed seal from the direct force of the reverse air pulse, thereby preventing rupture of said opposed seal.

2. The structure defined in claim 1, wherein said protector means is constructed and arranged to cause the direct air flow from the reverse air pulse cleaning to enter said filtering medium at a point spaced from said opposed seal.

3. The structure defined in claim 1, wherein said protector means is comprised of a transverse imperforate plate extending normal to said axis of said air inlet passageway at a point adjacent said opposed seal.

4. The structure defined in claim 1, wherein said protector means lies in a plane generally normal to said axis of said air inlet passageway.

5. The structure defined in claim 4, wherein said protector means is disposed adjacent said seal.

6. The structure defined in claim 1, wherein said housing is further comprised of:
 (e) a pair of elongated co-axially perforated cylinders, one of said cylinders constituting an inner core cylinder and the other said cylinder constituting an outer body cylinder, said inner core cylinder having a smaller diameter than said outer body cylinder and being disposed within said outer body cylinder such that said outer body cylinder surrounds said inner core cylinder;
 (f) said end plates constituting a top plate and a base plate, at least one of said end plates having a center bore therein and each of said end plates being constructed and arranged to sealably connect one end of said inner core cylinder to one end of said outer body cylinder; and
 (g) said filter medium being disposed between said inner core cylinder and said outer body cylinder.

7. The structure defined in claim 6, wherein said protector means is constructed and arranged to cause the direct force of the reverse air pulses to be substantially dissipated through said inner core cylinder and said top plate.

8. The structure defined in claim 6, wherein said protector means is disposed within said inner core cylinder and connected thereto.

9. The structure defined in claim 8, wherein said protector means is connected to said inner core cylinder at a point adjacent said seal.

10. A filter which is cleaned by pressurized reverse air pulses emitted from a reverse air pulse source, comprising:
 (a) a filter medium for filtering foreign particles from the substance passing therethrough;
 (b) a perforated housing having end plates and containing said filter medium, said filter medium being connected to said end plates and forming seals thereby, one of said end plates having an inlet therein, and one of said seals being disposed in confronting relation to said inlet, said housing defining an air inlet passageway with an axis of air travel for receiving reverse air pulses for cleaning said filter medium, and for providing an outlet for the filtered substance; and
 (c) a rigid imperforate protector plate separate from said end plates and transversely disposed within said air inlet passageway, said protector plate being devoid of substantial axially extending flow directing structure and being constructed and arranged so that the direct forces of the reverse air pulses used for cleaning said filter medium do not directly contact said end plate forming said confronting seal.

11. The structure defined in claim 10, wherein said protector plate lies in a plane substantially transverse to said axis of said air inlet passageway.

12. The structure defined in claim 10, wherein said protector plate is connected to said housing at a point adjacent said end plate which forms said confronting seal with said filter medium.

13. The structure defined in claim 12, wherein said protector plate is constructed and arranged to absorb the direct forces of the reverse air pulses and to dissipate the same through said housing.

14. The structure defined in claim 10, wherein said housing containing said filter medium is comprised of an inner core cylinder surrounded by an outer body cylinder which is connected to said inner core cylinder, said filtering medium being disposed between said inner core cylinder and said outer body cylinder.

15. The structure defined in claim 14, wherein said protector plate constitutes a disk which is connected to said inner cylinder and disposed therein, said inner cylinder defining said air inlet passageway and said disk being constructed and arranged to absorb the direct force of the reverse air pulses used for cleaning the filter and to direct the same through said filter medium at a point spaced from said end plates in order to protect said seal which is disposed in confronting relation to said inlet.

* * * * *

UNITED STATES PATENT AND TRADEMARK OFFICE
CERTIFICATE OF CORRECTION

PATENT NO. : 4,818,261

DATED : April 4, 1989

INVENTOR(S) : Weir E. Beckon

It is certified that error appears in the above-identified patent and that said Letters Patent is hereby corrected as shown below:

Claim 5, Line 2, after "said" insert --opposed--.

Claim 9, Line 3, after "said" insert --opposed--.

Signed and Sealed this

Tenth Day of October, 1989

Attest:

DONALD J. QUIGG

*Attesting Officer*  *Commissioner of Patents and Trademarks*